(12) United States Patent
Fujishiro et al.

(10) Patent No.: US 9,712,989 B2
(45) Date of Patent: Jul. 18, 2017

(54) COMMUNICATION CONTROL METHOD, BASE STATION, AND USER TERMINAL

(71) Applicant: KYOCERA CORPORATION, Kyoto (JP)

(72) Inventors: Masato Fujishiro, Yokohama (JP); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/768,104

(22) PCT Filed: Feb. 18, 2014

(86) PCT No.: PCT/JP2014/053750
§ 371 (c)(1),
(2) Date: Aug. 14, 2015

(87) PCT Pub. No.: WO2014/129456
PCT Pub. Date: Aug. 28, 2014

(65) Prior Publication Data
US 2016/0007183 A1  Jan. 7, 2016

Related U.S. Application Data

(60) Provisional application No. 61/766,468, filed on Feb. 19, 2013.

(51) Int. Cl.
*H04W 4/00* (2009.01)
*H04W 8/00* (2009.01)
(Continued)

(52) U.S. Cl.
CPC ......... *H04W 8/005* (2013.01); *H04W 52/243* (2013.01); *H04W 52/383* (2013.01);
(Continued)

(58) Field of Classification Search
CPC ... H04W 76/023; H04W 8/005; H04W 4/005; H04W 4/008; H04W 92/18
See application file for complete search history.

(56) References Cited

U.S. PATENT DOCUMENTS

2009/0197590 A1* 8/2009 Borran ............... H04W 52/242
455/423
2010/0317291 A1* 12/2010 Richardson ....... H04W 74/0825
455/63.1
(Continued)

FOREIGN PATENT DOCUMENTS

EP        3021614 A1     5/2016
WO    2011/116017 A1    9/2011
(Continued)

OTHER PUBLICATIONS

International Search Report, PCT/JP2014/053750, Apr. 15, 2014.
(Continued)

*Primary Examiner* — Khalid Shaheed
(74) *Attorney, Agent, or Firm* — Studebaker & Brackett PC

(57) ABSTRACT

A communication control method is used in a mobile communication system that supports cellular communication in which a data path passes through a core network, and D2D communication that is direct device-to-device communication in which a data path does not pass through the core network. The communication control method comprises: a transmission step of transmitting, by a first user terminal that camps on a cell of a first base station, a discovery-use signal related to the discovery of a proximal terminal be capable of a communication partner of the D2D communication; and a notification step of notifying, by a communication device, the first base station of interference information related to
(Continued)

the received discovery-use signal in response to the communication device receiving the discovery-use signal.

16 Claims, 6 Drawing Sheets

(51) Int. Cl.
    *H04W 52/24*     (2009.01)
    *H04W 52/38*     (2009.01)
    *H04W 72/04*     (2009.01)
    *H04W 72/08*     (2009.01)
    *H04W 88/06*     (2009.01)
    *H04W 88/10*     (2009.01)

(52) U.S. Cl.
    CPC ....... *H04W 72/048* (2013.01); *H04W 72/082* (2013.01); *H04W 88/06* (2013.01); *H04W 88/10* (2013.01)

(56) References Cited

U.S. PATENT DOCUMENTS

| | | | |
|---|---|---|---|
| 2011/0066738 A1* | 3/2011 | Richardson | H04W 72/02 709/229 |
| 2012/0014334 A1 | 1/2012 | Oh et al. | |
| 2012/0044815 A1* | 2/2012 | Geirhofer | H04W 8/005 370/248 |
| 2012/0269072 A1 | 10/2012 | Wu et al. | |
| 2013/0295976 A1* | 11/2013 | Patil | H04W 24/10 455/501 |
| 2016/0157081 A1 | 6/2016 | Kwak et al. | |

FOREIGN PATENT DOCUMENTS

| | | |
|---|---|---|
| WO | 2011/123516 A2 | 10/2011 |
| WO | 2011/130623 A2 | 10/2011 |
| WO | 2011/143496 A1 | 11/2011 |

OTHER PUBLICATIONS

Written Opinion of the International Searching Authority, PCT/JP2014/053750, Apr. 15, 2014.

3rd Generation Partnership Project; Technical Specification Group Services and System Aspects; Feasibility study for Proximity Services (ProSe) (Release 12), 3GPP TR 22.803 v12.0.0 (Dec. 2012).

The partial supplementary European search report issued by the European Patent Office on Aug. 18, 2016, which corresponds to European Patent Application No. 14754792.1-1854 and is related to U.S. Appl. No. 14/768,104.

* cited by examiner

COMMUNICATION CONTROL METHOD, BASE STATION, AND USER TERMINAL

TECHNICAL FIELD

The present invention relates to a communication control method, a base station, and a user terminal, which are used in a mobile communication system that supports D2D communication.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1).

In the D2D communication, a plurality of proximal user terminals (a user terminal group) perform direct communication without any intervention of a core network. That is, a data path of the D2D communication does not pass through the core network. On the other hand, a data path of normal communication (cellular communication) of a mobile communication system passes through the core network.

PRIOR ART DOCUMENT

Non-Patent Document

[Non Patent Document 1] 3GPP technical report "TR 22.803 V12.0.0" December 2012

SUMMARY OF THE INVENTION

It is assumed that D2D communication is performed in a frequency band assigned to a mobile communication system (a so-called licensed band). Accordingly, it is probable that deterioration of communication quality occurs by the influence of interference between cellular communication and D2D communication.

Therefore, the present invention provides a communication control method, a base station, and a user terminal, by which it is possible to suppress interference between cellular communication and D2D communication.

A communication control method according to an embodiment is used in a mobile communication system that supports cellular communication in which a data path passes through a core network, and D2D communication that is direct device-to-device communication in which a data path does not pass through the core network. The communication control method comprises: a transmission step of transmitting, by a first user terminal that camps on a cell of a first base station, a discovery-use signal related to the discovery of a proximal terminal be capable of a communication partner of the D2D communication; and a notification step of notifying, by a communication device, the first base station of interference information related to the received discovery-use signal in response to the second base station receiving the discovery-use signal.

A base station according to an embodiment comprises: a controller configured to notify another base station of interference information related to a discovery-use signal for a proximal terminal to be a communication destination of the D2D communication in response to the base station receiving the discovery-use signal, the discovery-use signal being a signal that is transmitted from a user terminal that camps on a cell of the other base station.

A base station according to an embodiment comprises: a controller configured to transmit instruction information for instructing transmission of a discovery-use signal related to the discovery of a proximal terminal that is capable of a communication partner of the D2D communication, to a user terminal that camps on a cell of the base station and is performing the D2D communication.

A user terminal according to an embodiment camps on a cell of a base station. The user terminal comprises: a controller configured to transmit a discovery-use signal related to the discovery of a proximal terminal that is capable of a communication partner of the D2D communication, when instruction information for instructing transmission of the discovery-use signal is received from the base station in a case in which the user terminal is performing the D2D communication.

MODE FOR CARRYING OUT THE INVENTION

[Overview of Embodiment]

Figure 1:
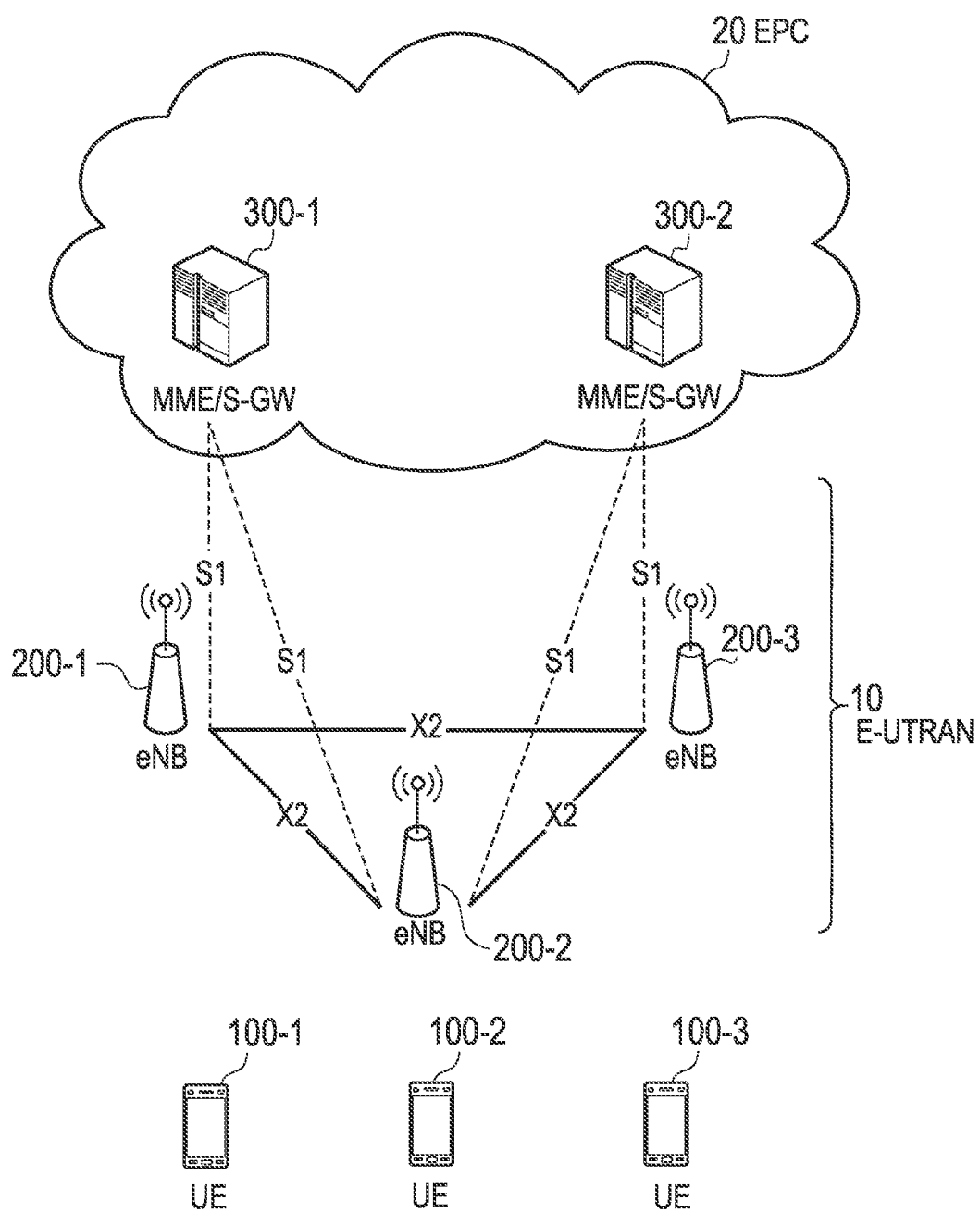
FIG. 1 is a configuration diagram of an LTE system.

A communication control method according to a first embodiment and a second embodiment is used in a mobile communication system that supports cellular communication in which a data path passes through a core network, and D2D communication that is direct device-to-device communication in which a data path does not pass through the core network. The communication control method comprises: a transmission step of transmitting, by a first user terminal that camps on a cell of a first base station, a discovery-use signal related to the discovery of a proximal terminal be capable of a communication partner of the D2D communication; and a notification step of notifying, by a communication device, the first base station of interference information related to the received discovery-use signal in response to the second base station receiving the discovery-use signal.

In the first embodiment and the second embodiment, the communication device is a neighbor base station of the first base station.

In the first embodiment, in the notification step, the communication device notifies the first base station of the interference information when reception power of the discovery-use signal exceeds a threshold value.

In the first embodiment, the discovery-use signal includes a terminal identifier for identifying the first user terminal. In the notification step, the communication device controls the terminal identifier to be included into the interference information.

In the first embodiment, in the notification step, the communication device controls reception power of the discovery-use signal in the communication device, or transmission power control information of at least one of the discovery-use signal and a D2D communication signal to be included into the interference information.

In the first embodiment, in the notification step, the communication device notifies all neighbor base stations including the first base station of the interference information.

In the first embodiment, the discovery-use signal includes a cell identifier for identifying a cell of the first base station. In the notification step, the communication device notifies the first base station of the interference information on the basis of the cell identifier included in the discovery-use signal.

In the first embodiment, it further comprises a step of sharing, by the communication device, information on a radio resource with the first base station, the radio resource being used when the first user terminal transmits the discovery-use signal; and a step of detecting, by the communication device, reception of the discovery-use signal on the basis of the shared information.

In the first embodiment, it further comprises a step of transmitting, by a second user terminal, power information on reception power of the discovery-use signal in the second user terminal to a serving cell of the second user terminal in response to the second user terminal receiving the discovery-use signal.

In the first embodiment, it further comprises a step of transmitting, by the first base station, power control information for reducing transmission power of at least one of the discovery-use signal and a D2D communication signal to the first user terminal in response to the first base station receiving the interference information.

In the second embodiment, it further comprises an instruction step of transmitting, by the first base station, instruction information for instructing transmission of the discovery-use signal to the first user terminal that is performing the D2D communication. In the transmission step, the first user terminal that is performing the D2D communication transmits the discovery-use signal in response to reception of the instruction information.

In the second embodiment, in the instruction step, the first base station transmits the instruction information to the first user terminal, which is performing the D2D communication, in response to the reception of the interference information.

In the second embodiment, in the transmission step, the first user terminal that is performing the D2D communication cyclically transmits the discovery-use signal. The communication control method further comprises: a step of transmitting, by the first base station, instruction information for instructing transmission stop of the discovery-use signal to the first user terminal when the first base station specifies the first user terminal as an interfering terminal on the basis of the interference information.

In the second embodiment, in the instruction step, when it is determined that a geographical location of the first user terminal that is performing the D2D communication nears a geographical location of the second base station, the first base station transmits the instruction information to the first user terminal that is performing the D2D communication.

In the second embodiment, the communication control method further comprises: a step of transmitting power control information for reducing transmission power of the D2D communication or resource information for changing a radio resource of the D2D communication to the first user terminal as interference avoidance control when the first base station specifies the first user terminal that is performing the D2D communication, as an interfering terminal on the basis of the interference information.

In the second embodiment, the communication control method further comprises: a step of notifying, by the first base station, the communication device of information indicating whether or not to perform the interference avoidance control.

In other embodiment, the communication device is a user terminal controlling the D2D communication, in a cluster comprising a plurality of user terminals adjacent to each other.

A base station according to a first embodiment and a second embodiment is used in a mobile communication system that supports cellular communication in which a data path passes through a core network, and D2D communication that is direct device-to-device communication in which a data path does not pass through the core network. The base station comprises: a controller configured to notify the first base station of interference information related to a discovery-use signal related to the discovery of a proximal terminal be capable of a communication partner of the D2D communication, from the communication device in response to the base station receiving the discovery-use signal, the discovery-use signal being a signal that is transmitted from a user terminal that camps on a cell of the other base station.

A base station according to a first embodiment and a second embodiment is used in a mobile communication system that supports cellular communication in which a data path passes through a core network, and D2D communication that is direct device-to-device communication in which a data path does not pass through the core network. The base station comprises: a controller configured to transmit instruction information for instructing transmission of a discovery-use signal related to the discovery of a proximal terminal be capable of a communication partner of the D2D communication, to a user terminal that camps on a cell of the base station and is performing the D2D communication.

A user terminal according to a first embodiment and a second embodiment camps on a cell of a base station in a mobile communication system that supports cellular communication in which a data path passes through a core network, and D2D communication that is direct device-to-device communication in which a data path does not pass through the core network. The user terminal comprises: a controller configured to transmit a discovery-use signal for a proximal terminal that is to be a communication destination of the D2D communication, when instruction information for instructing transmission of the discovery-use signal is received from the base station in a case in which the user terminal is performing the D2D communication.

[First Embodiment]

Hereinafter, with reference to the accompanying drawings, description will be provided for an embodiment in a case where D2D communication is introduced to a mobile communication system (an LTE system) configured based on the 3GPP standards.

(LTE System)

FIG. 1 is a configuration diagram of an LTE system according to the first embodiment. As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 corresponds to a radio access network and the EPC 20 corresponds to a core network. The E-UTRAN 10 and the EPC 20 configure a network of the LTE system.

The UE 100 is a mobile communication device and performs radio communication with a cell (a serving cell) with which a connection is established. The UE 100 corresponds to a user terminal.

The E-UTRAN 10 includes a plurality of eNBs 200 (evolved Node-Bs). The eNB 200 corresponds to a base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a plurality of MME (Mobility Management Entity)/S-GWs (Serving-Gateways) 300. The MME is a network node for performing various mobility controls and the like for the UE 100 and corresponds to a controller. The S-GW is a network node that performs transfer control of user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
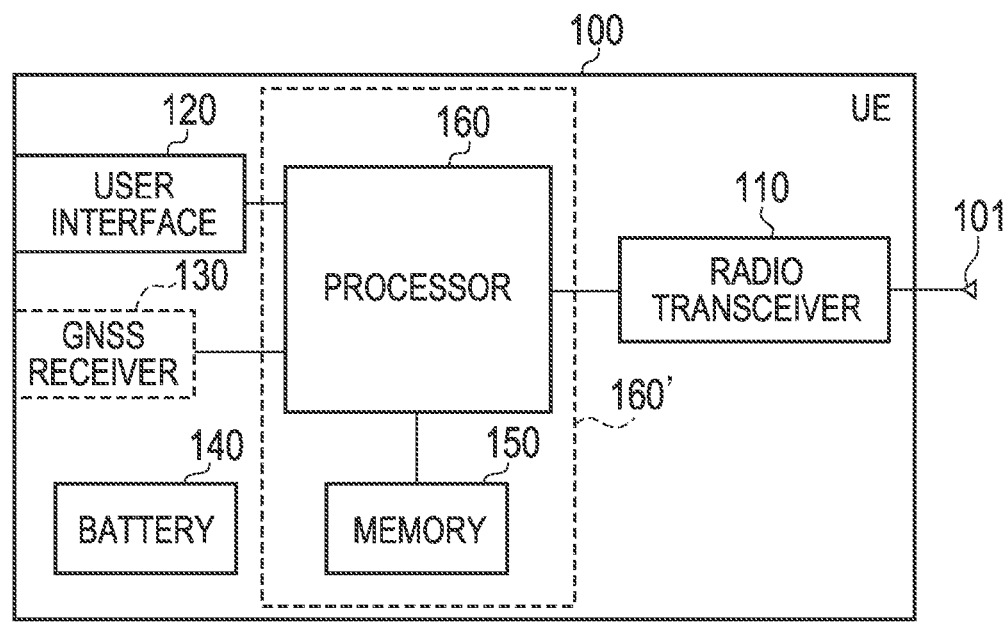
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a control unit. The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
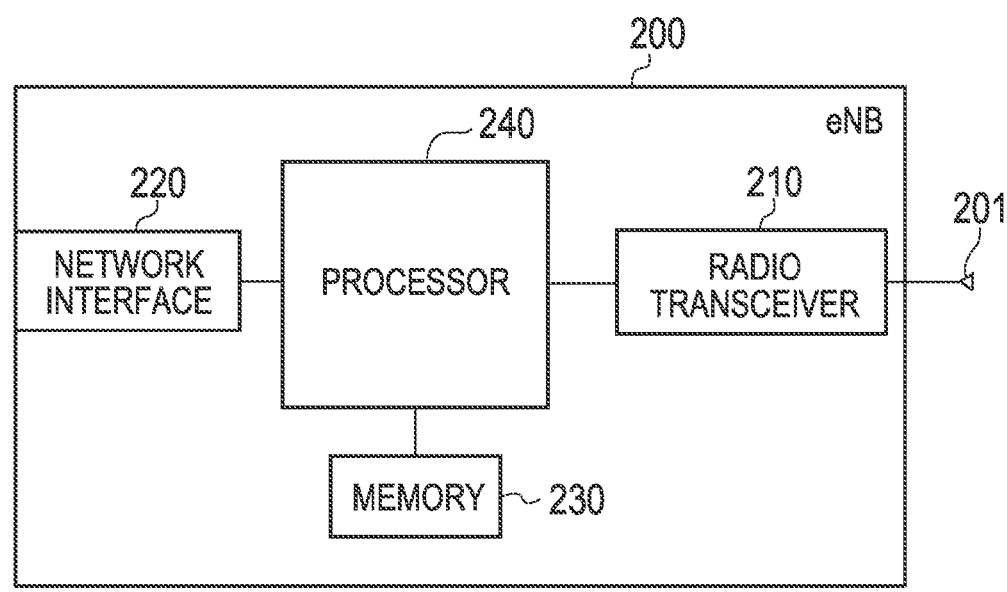
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 configure a control unit. Furthermore, the memory 230 may be integrally formed with the processor 240, and this set (that is, a chip set) may be called a processor.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, and encoding and decoding and the like on the baseband signal and a CPU that performs various processes by executing the program stored in the memory 230. The processor 240 executes various processes and various communication protocols described later.

Figure 4:
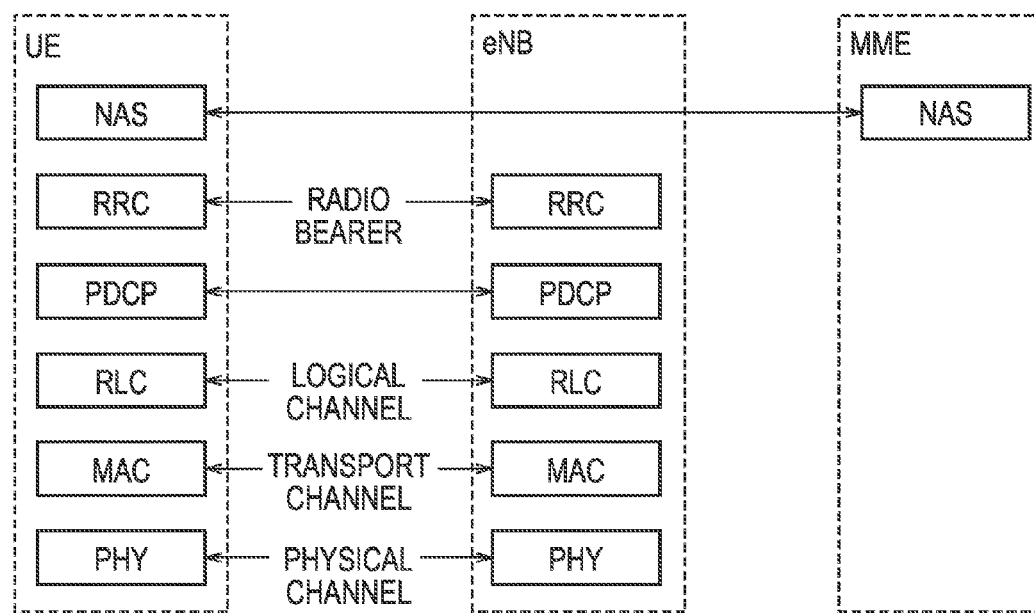
FIG. 4 is a protocol stack diagram of a radio interface in the LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size and a modulation and coding scheme (MCS)) and a scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), and when there is no RRC connection, the UE 100 is in an idle state (an RRC idle state).

A NAS (Non-Access Stratum) layer positioned above the RRC layer performs session management, mobility management and the like.

Figure 5:
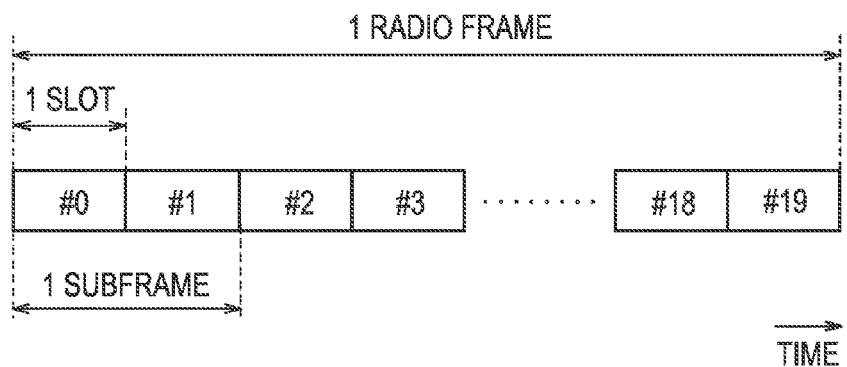
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Among radio resources assigned to the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. Furthermore, the central portion in the frequency direction of each subframe is a region available as a physical uplink shared channel (PUSCH) for mainly transmitting user data.

(D2D Communication)

The LTE system according to the first embodiment supports the D2D communication that is direct communication between UEs. Hereinafter, the D2D communication will be described in comparison with normal communication (cellular communication) of the LTE system.

In the cellular communication, a data path passes through the EPC 20 that is a core network. The data path indicates a communication path of user data (a user plane). On the other hand, in the D2D communication, the data path set between the UEs does not pass through the EPC 20. Thus, it is possible to reduce traffic load of the EPC 20.

The UE 100 discovers another UE 100 that exists in the vicinity of the UE 100, and starts the D2D communication. The D2D communication includes a direct communication mode and a locally routed mode.

Figure 6:
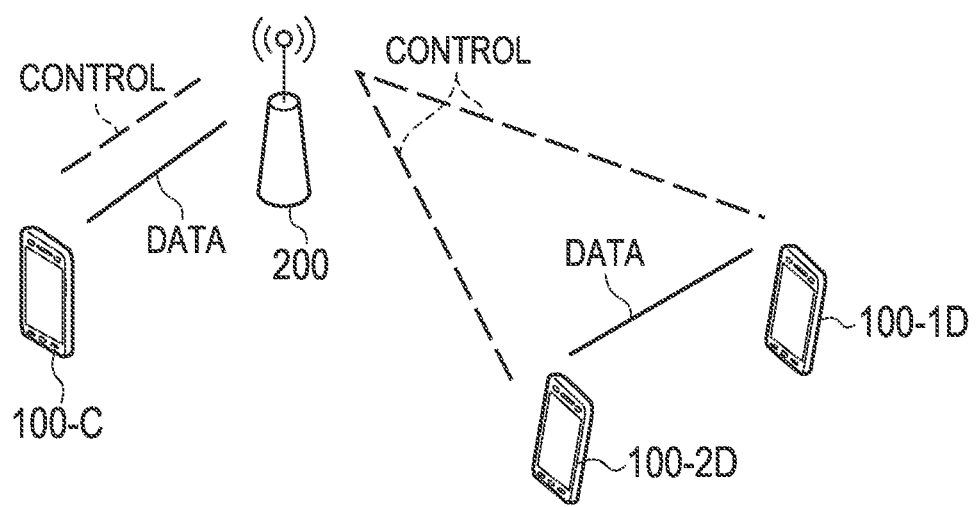
FIG. 6 is a diagram illustrating a data path in cellular communication.

FIG. 6 is a diagram for describing the direct communication mode in the D2D communication. As illustrated in FIG. 6, in the direct communication mode, a data path does not pass through the eNB 200. UE 100-1D and UE 100-2D adjacent to each other directly perform radio communication with low transmission power in a cell of the eNB 200. Thus, a merit including reduction of power consumption of the UE 100 and decrease of interference to a neighbor cell can be obtained.

The UE 100-1D and the UE 100-2D are D2D UEs (D2D terminals) that perform the D2D communication of the direct communication mode in the cell of the eNB 200. The UE 100-1D and the UE 100-2D in a connected state perform the D2D communication by using a radio resource that is assigned from the eNB 200. The UE 100-1D and the UE 100-2D exchange user data with each other, and exchange a control signal with the eNB 200. As described above, the control of the D2D communication is performed at the initiative of the eNB 200.

Any one UE of the UE 100-1D and the UE 100-2D may be an anchor UE (an anchor terminal) capable of controlling the other UE in the D2D communication. The anchor UE may have a decision right of a radio resource that is used in the D2D communication, or may be able to transmit a control signal to the other UE (a communication partner UE). When the anchor UE exists, the other UE (the communication partner UE) may exchange the control signal with the anchor UE without exchanging the control signal with the eNB 200.

UE 100-C is a cellular UE (a cellular terminal) that performs cellular communication in the cell of the eNB 200. The UE 100-C in a connected state performs the cellular communication by using the radio resource that is assigned from the eNB 200. The UE 100-C exchanges user data and a control signal with the eNB 200.

In addition, in the locally routed mode, a data path between UEs passes through the eNB 200, however, the data path does not pass through the EPC 20. That is, in the locally routed mode, the UE 100-1D and the UE 100-2D perform radio communication via the eNB 200 without any intervention of the EPC 20. The locally routed mode is able to reduce traffic load of the EPC 20, however, has small merit as compared with the direct communication mode. Thus, in the first embodiment, the direct communication mode is mainly assumed.

Furthermore, in the first embodiment, the D2D communication is performed in a frequency band (a so-called licensed band) assigned to the LTE system.

It is noted that cases in which the D2D communication is started include (a) a case in which the D2D communication is started after a proximal terminal is discovered by performing an operation for discovering a proximal terminal, and (b) a case in which the D2D communication is started without performing an operation for discovering a proximal terminal.

For example, in the above-described case (a), one UE 100 of the UE 100-1 and the UE 100-2 discovers the other UE 100 existing in the vicinity of the one UE 100, so that the D2D communication is started.

In such a case, in order to discover the proximal terminal, the UE 100 has a (Discover) function of discovering another UE 100 existing in the vicinity of the UE 100, and/or a (Discoverable) function of being discovered by another UE 100.

Specifically, the UE 100-1 transmits a discovery signal (Discovery signal/Discoverable signal) indicates a signal for discovering the proximal terminal or a signal that is used to be discovered from the proximal terminal. The UE 100-2 which received the discovery signal discovers the UE 100-1. When the UE 100-2 transmits a response to the discovery signal, the UE 100-1 that has transmitted the discovery signal discovers the UE 100-2, which is the proximal terminal.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts. Additionally, the UE 100-1 may report the discovery of the proximal UE 100 (that is, the UE 100-2) to an upper layer (e.g. application, etc.), if the UE 100-1 did not perform. the D2D communication after discovering the proximal terminal. For example, the application executes the process (e.g. process of plotting the location of the UE 100-2 to the map information) based on the report.

Furthermore, the UE 100 may report the eNB 200 that the proximal terminal has been discovered and may receive an instruction from the eNB 200 indicate the commutation with the proximal terminal is performed in cellular communication or in the D2D communication.

On the other hand, in the above-described case (b), for example, the UE 100-1 starts the transmission (such as a notification through broadcasting) of a signal for the D2D communication without specifying a proximal terminal. Thus, the UE 100 is capable of starting the D2D communication regardless of the existence of the discovery of a proximal terminal. It is noted that the UE 100-2 that is performing the standby operation for the signal for the D2D communication performs synchronization or/and demodulation on the basis of the signal from the UE 100-1.

(Operation According to First Embodiment)

Figure 7:
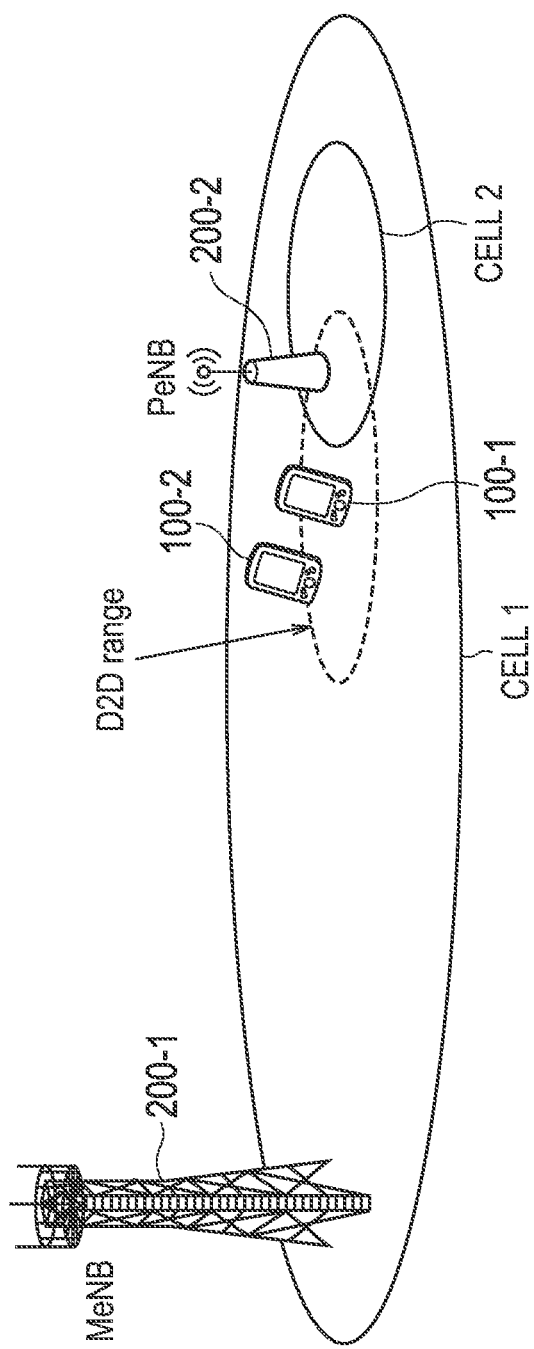
FIG. 7 is a diagram for describing an operation environment according to the first embodiment.

Next, an operation according to the first embodiment will be described. FIG. 7 is a diagram for describing an operation environment according to the first embodiment. As illustrated in FIG. 7, MeNB (macro base station) 200-1 manages a cell 1 (a macro cell). UE 100-1 and UE 100-2 camp on the cell 1. That is, the cell 1 is a serving cell of each of the UE 100-1 and the UE 100-2. In the first embodiment, each of the UE 100-1 and the UE 100-2 is in a connected state in the cell 1.

PeNB (pico base station) 200-2 manages a cell 2 (a pico cell) in the cell 1. The PeNB 200-2 corresponds to a neighbor eNB of the MeNB 200-1. The cell 2 is a cell with a coverage smaller than that of the cell 1. As described above, in the first embodiment, an operation environment, in which the cell 2 (the pico cell) is provided in the cell 1 (the macro cell), is assumed.

The UE 100-1 and the UE 100-2 are connected to the cell 1, however, are located in the vicinity of the cell 2. Thus, when it is assumed that the UE 100-1 and the UE 100-2 perform the D2D communication, it is probable that a transmission signal from the UE 100-1 and/or the UE 100-2 gives an influence of interferences to the cell 2, resulting in the deterioration of communication quality in the cell 2.

In the first embodiment, the UE 100-1 transmits a discovery-use signal related to the discovery of a proximal terminal be capable of a communication partner of the D2D communication. The UE 100-1, which transmits the discovery-use signal, may not perform the D2D communication or may perform the D2D communication.

In the first embodiment, the discovery-use signal indicates a signal (a Discovery signal) for discovering the proximal terminal. However, the discovery-use signal may indicate a signal (a Discoverable signal) that is discovered from the proximal terminal. The Discovery signal may be transmitted with transmission power equivalent to that of a data signal (a D2D communication signal) that is transmitted during the D2D communication.

Figure 8:
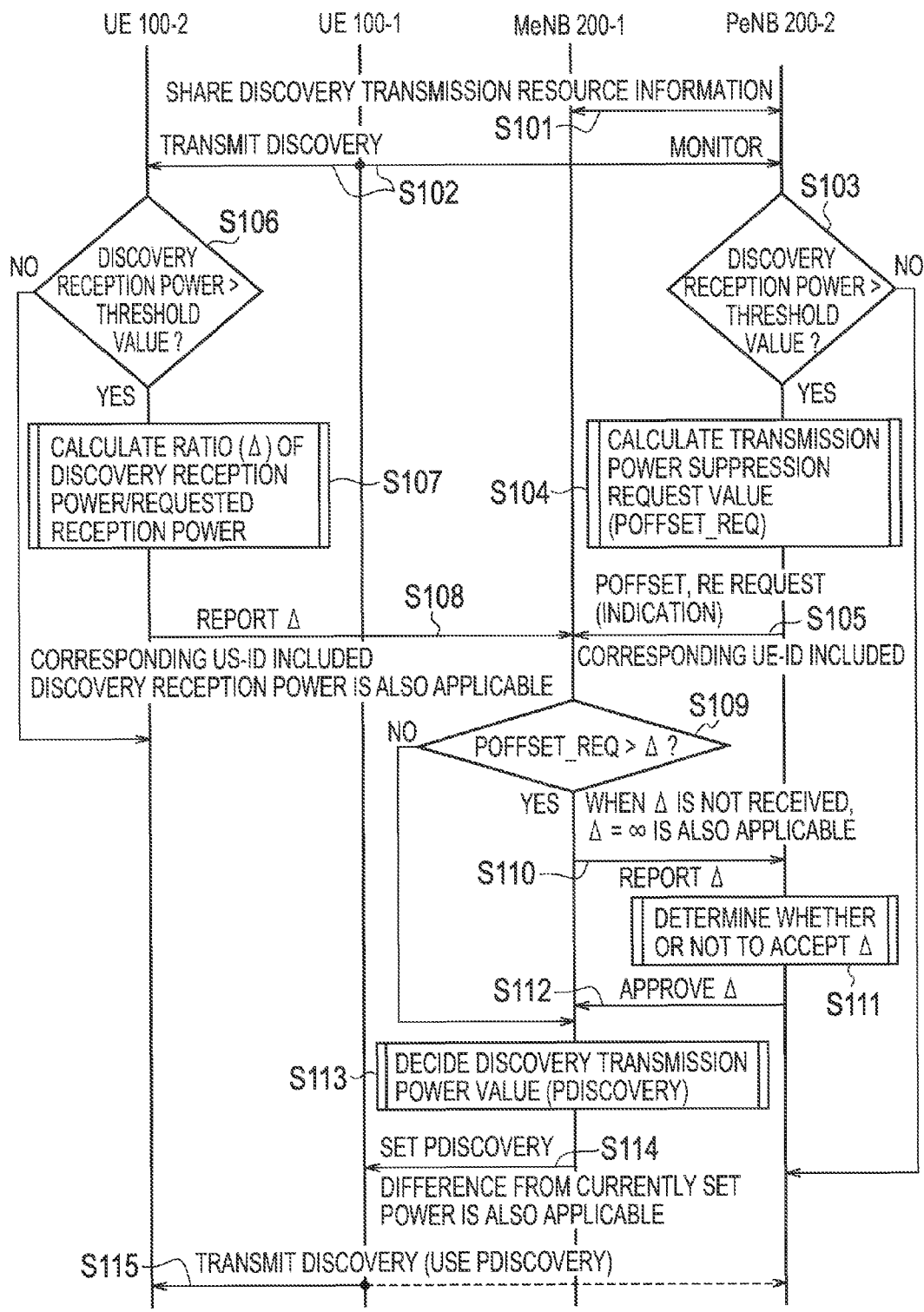
FIG. 8 is an operation sequence diagram according to the first embodiment.

FIG. 8 is an operation sequence diagram according to the first embodiment.

As illustrated in FIG. 8, in step S101, the PeNB 200-2 shares information on a radio resource (a time/frequency resource), which is used when the UE 100-1 transmits the Discovery signal, with the MeNB 200-1. In the first embodiment, the information on the radio resource used in the transmission of the Discovery signal is notified from the MeNB 200-1 to the PeNB 200-2. For example, the MeNB 200-1 may notify the PeNB 200-2 of a transmission timing of the Discovery signal before the transmission timing, or when the transmission timing of the Discovery signal is cyclic, the MeNB 200-1 may also notify the PeNB 200-2 of the cycle or a timing (a subframe and the like) corresponding to the cycle. Furthermore, the MeNB 200-1 and/or the PeNB 200-2 may perform control such that cellular communication is stopped and/or D2D communication is stopped at the transmission timing of the Discovery signal.

In step S102, the UE 100-1 transmits the Discovery signal. The Discovery signal includes a UE identifier for identifying the UE 100-1. The Discovery signal may further include a cell identifier for identifying a cell of the MeNB 200-1. The PeNB 200-2 receives the Discovery signal from the UE 100-1. In this case, the PeNB 200-2 detects the reception of the Discovery signal on the basis of the information shared with the MeNB 200-1.

In step S103 to step S105, the PeNB 200-2 notifies the MeNB 200-1 of Discovery interference information (Indication) on the received Discovery signal in response to the reception of the Discovery signal. In the first embodiment, when reception power of the Discovery signal exceeds a threshold value (S103; Yes), the PeNB 200-2 decides to notify the MeNB 200-1 of the Discovery interference information. In step S104, the PeNB 200-2 generates the Discovery interference information to be notified to the MeNB 200-1. The Discovery interference information includes the following information.

The UE identifier included in the Discovery signal.

The reception power of the Discovery signal in the PeNB 200-2, or transmission power control information of the Discovery signal and/or the D2D communication signal. In this case, the transmission power control information, for example, is information indicating a power reduction request (information indicating the degree by which transmission power is to be lowered), an upper limit of the transmission power (maximum transmission power), or a designated transmission power value.

The Discovery interference information may also include information on a radio resource (a resource block, a subframe, and a frequency band) used in the reception of the Discovery signal, information on path loss (propagation loss) that is estimated from the reception power of the Discovery signal, a cell identifier of a cell (a cell 2), in which the Discovery signal is received, and the like. A format example of the Discovery interference information is shown in Table 1.

TABLE 1

| IE/Group Name | Presence | Range | IE type and reference | Remark |
| --- | --- | --- | --- | --- |
| Discovery Interference Indication | M | | ENUMERATED (high interference, medium | Reception power of Discovery signal, |

TABLE 1-continued

| IE/Group Name | Presence | Range | IE type and reference | Remark |
|---|---|---|---|---|
| | | | interference, low interference, . . . ) | Discovery transmission power reduction request (how many dB is desired to be further lowered). |
| UE ID | M | | | |
| Discovery Interference PRB | O | 1 to <maxnoofPRBs> | | Resource block number |
| Discovery Interference Subframe | O | 0 to <maxnoofSubframes> | | Subframe number |
| Discovery Interference Band | O | 1 to <maxnoofBands> | | Band (frequency band) number |

In step S105, the PeNB 200-2 notifies the MeNB 200-1 of the Discovery interference information. The PeNB 200-2 may directly notify the MeNB 200-1 of the Discovery interference information on the X2 interface, or may indirectly notify the MeNB 200-1 of the Discovery interference information on the S1 interface. The PeNB 200-2 notifies all neighbor eNBs including the MeNB 200-1 of the Discovery interference information. Alternatively, when the cell identifier is included in the Discovery signal, the PeNB 200-2 may also notify only a cell (the cell 1), which is indicated by the cell identifier, of the Discovery interference information.

When the MeNB 200-1 recognizes that UE corresponding to the UE identifier included in the Discovery interference information from the PeNB 200-2 exists in the cell of the MeNB 200-1, the MeNB 200-1 may return a response to the PeNB 200-2. On the other hand, when the UE corresponding to the UE identifier does not exist in the cell of the MeNB 200-1, the MeNB 200-1 may notify the PeNB 200-2 thereof.

On the other hand, in step S102, the UE 100-2 receives the Discovery signal from the UE 100-1. In step S106 to step S108, the UE 100-2 transmits Discovery power information on the reception power of the Discovery signal in the UE 100-2 to a serving cell (the cell 1) in response to the reception of the Discovery signal. In the first embodiment, when the reception power of the Discovery signal exceeds a threshold value (S106; Yes), the UE 100-2 decides to transmit the Discovery power information to the MeNB 200-1. Instep S107, the UE 100-2 generates the Discovery power information to be transmitted to the MeNB 200-1. The Discovery power information includes the following information.

- The UE identifier included in the Discovery signal.
- The reception power of the Discovery signal in the UE 100-2, or a ratio (information indicating the degree by which transmission power of the UE 100-1 may be lowered) of the reception power of the Discovery signal and/or the D2D communication signal with respect to requested reception power. In this case, the requested reception power indicates reception power that is required in order to establish or maintain the D2D communication.

The UE 100-2 may transmit the Discovery power information in response to a request or setting from the MeNB 200-2. The UE 100-2 may control the Discovery power information to be included into a D2D request for requesting the start of the D2D communication, and transmit the D2D request.

In step S108, the UE 100-2 transmits (reports) the Discovery power information to the MeNB 200-1.

In step S109 to step S114, in response to the reception of the Discovery interference information from the PeNB 200-2, the MeNB 200-1 transmits power control information for reducing the transmission power of the Discovery signal and/or the D2D communication signal to the UE 100-1. In the first embodiment, in step S109, the MeNB 200-1 determines whether or not to reduce the transmission power of the UE 100-1 on the basis of the Discovery interference information from the PeNB 200-2 and the Discovery power information from the UE 100-2. For example, the MeNB 200-1 specifies "transmission power that can be reduced" from the Discovery power information and specifies "transmission power to be reduced" from the Discovery interference information. Then, when the transmission power to be reduced is equal to or less than the transmission power that can be reduced, the MeNB 200-1 determines to reduce the transmission power of the UE 100-1.

On the other hand, in the case in which the transmission power to be reduced exceeds the transmission power that can be reduced, the MeNB 200-1 may negotiate a reduction amount of the transmission power of the UE 100-1 with the PeNB 200-2. For example, the MeNB 200-1 notifies the PeNB 200-2 of the transmission power that can be reduced (or transmission power after reduction) (S110). The PeNB 200-2 determines whether or not to accept the transmission power that can be reduced (or the transmission power after reduction) (S111), and notifies the MeNB 200-1 of a determination result (S112).

Alternatively, in the case in which the transmission power to be reduced exceeds the transmission power that can be reduced, when the UEs 100-1 and the 100-2 do not perform the D2D communication, the MeNB 200-1 may perform control such that the D2D communication does not start.

In step S113, the MeNB 200-1 decides transmission power after reduction with respect to the UE 100-1 (the transmission power of the Discovery signal and/or the D2D communication signal). The MeNB 200-1 notifies (sets) the UE 100-1 of the decided transmission power ($P_{Discovery}$). The UE 100-1 performs the transmission of the Discovery signal and/or the D2D communication signal with the transmission power notified from the MeNB 200-1 (S114). The UE 100-1 may notify the UE 100-2 of the notified transmission power if the UE 100-2 perform the D2D communication.

As described above, in the first embodiment, the PeNB 200-2 notifies the MeNB 200-1 of the Discovery interference information (Indication) on the received Discovery signal in response to the reception of the Discovery signal, so that the MeNB 200-1 is able to perform transmission power control for suppressing interference.

[Second Embodiment]

The second embodiment will be described while focusing on the difference from the first embodiment. An operation environment according to the second embodiment is similar to that of the first embodiment. Hereinafter, an operation according to the second embodiment will be described.

Firstly, the MeNB 200-1 transmits instruction information for instructing the transmission of the Discovery signal to the UE 100-1 that is performing D2D communication. The UE 100-1 that is performing D2D communication transmits the Discovery signal in response to the reception of the instruction information.

When it is determined that the geographical location of the UE 100-1 that is performing D2D communication nears the geographical location of the PeNB 200-2, the MeNB 200-1 may also transmit the instruction information to the UE 100-1. Since a technique for obtaining UE location information is well-known, a description thereof will be omitted.

Alternatively, the MeNB 200-1 may periodically transmit the instruction information to the UE 100-1, or may also transmit instruction information for instructing periodic transmission of the Discovery signal to the UE 100-1.

Alternatively, when the Discovery interference information is received from the PeNB 200-2, the MeNB 200-1 may also transmit the instruction information to the UE 100-1.

Alternatively, in response to a request or setting from the EPC 20, the MeNB 200-1 may also transmit the instruction information to the UE 100-1.

Secondly, similarly to the aforementioned first embodiment, the PeNB 200-2 receives the Discovery signal and transmits the Discovery interference information to the MeNB 200-1.

Thirdly, when the MeNB 200-1 specifies the UE 100-1 as an interfering UE on the basis of the Discovery interference information from the PeNB 200-2, the MeNB 200-1 performs any one of the following interference avoidance controls.

Transmit power control information for reducing transmission power of the D2D communication to the UE 100-1.

Transmit resource information for changing a radio resource of the D2D communication to the UE 100-1. For example, a radio resource changed corresponds to a D2D resource that is notified in advance from the PeNB 200-2 to the MeNB 200-1, a blank subframe in which the PeNB 200-2 performs no uplink assignment, or another band in which PeNB is not operated.

Instruct the UE 100-1 to switch the D2D communication to the cellular communication.

In addition, in the case in which the UE 100-1 cyclically transmits the Discovery signal, when the MeNB 200-1 specifies the UE 100-1 as an interfering UE on the basis of the Discovery interference information, the MeNB 200-1 may transmit, to the UE 100-1, instruction information for instructing transmission stop of the Discovery signal.

As described above, in the second embodiment, the MeNB 200-1 transmits the instruction information for instructing the transmission of the Discovery signal to the UE 100-1 that is performing the D2D communication, so that it is possible to confirm whether or not the UE 100-1 gives interference to a neighbor eNB (whether or not the UE 100-1 is an interfering UE).

[Other Embodiments]

In each of the aforementioned embodiments, the operation environment, in which the MeNB 200-1 (the macro cell) and the PeNB 200-2 (the pico cell) are installed, has been described as an example. However, the present invention may also be applied to an operation environment in which the same type of eNBs (the same type of cells) are installed.

Alternatively, in each of the aforementioned embodiments, in a D2D UE cluster (cluster) including a plurality of UEs 100 adjacent to each other, a cluster head (CHUE) which is a UE controlling the D2D communication may perform much the same operations as that of the PeNB 200-2. Specifically, the CHUE is capable of performing much the same operations as that of the PeNB 200-2 in the aforementioned S101 to S105 and S110 to S112.

It is noted that the CHUE serves as a reference for synchronization in the cluster, and is a UE that controls the D2D communication in the cluster. That is, the CHUE may be the aforementioned anchor UE. [0116] The CHUE may belong to a cluster to which the UE 100-1 and the UE 100-2 belong or a different cluster.

The CHUE and the PeNB 200-2 share in common in that both are capable of performing scheduling of radio resource.

In each of the aforementioned embodiments, the UE 100-1 performs the transmission of the Discovery signal and/or the D2D communication signal with the transmission power notified from the MeNB 200-1 (see S114); however, it is not limited thereto. The UE 100-1 may decide the transmission power of the Discovery signal and/or the D2D communication signal on the basis of the transmission power notified from the MeNB 200-1. Specifically, the UE 100-1 decides a transmission power that is equal to or less than the notified transmission power as the transmission power of the Discovery signal and/or the D2D communication signal. The UE 100-1 may notify the UE 100-1 of the decided transmission power. It is noted that when the radio resource that is used in the D2D communication is scheduled, the UE 100-1 may decide the transmission power of the Discovery signal and/or the D2D communication signal.

In each of the aforementioned embodiments, the UE 100-2 transmits (reports) the Discovery power information to the MeNB 200-1 (see S108); however, it is not limited thereto. For example, when the UE 100-2 is located out of a cell coverage managed by the MeNB 200-1, the UE 100-2 may transmit (report) the Discovery power information to the MeNB 200-1 via the UE 100-1 that exists in the cell coverage managed by the MeNB 200-1. Alternatively, when the UE 100-1 receives the Discovery power information from the UE 100-2 that is located out of the cell coverage of the MeNB 200-1, the UE 100-1 may decide the transmission power (the transmission power of the Discovery signal and/or the D2D communication signal) after reduction with respect to the UE 100-1, instead of transmitting the Discovery power information to the MeNB 200-1.

Further, in each of the aforementioned embodiments, the MeNB 200-1 may notify the UE 100-1 of the decided transmission power ($P_{Discovery}$ setting) by using a PDCCH (Physical Downlink Control Channel).

In each of the aforementioned embodiments, the direct communication mode in the D2D communication is mainly assumed. However, instead of the direct communication mode, the locally routed mode may also be applied.

Each of the aforementioned embodiments has described an example in which the present invention is applied to the LTE system. However, the present invention may also be applied to systems other than the LTE system, as well as the LTE system.

In addition, the entire content of U.S. Provisional Application No. 61/766,468 (filed on Feb. 19, 2013) is incorporated in the present specification by reference.

INDUSTRIAL APPLICABILITY

As described above, the communication control method, the base station, and the user terminal according to the present invention are able to suppress interference between cellular communication and D2D communication, and thus they are useful for a mobile communication field.

The invention claimed is:

1. A communication control method that is used in a mobile communication system, comprising:
 a transmission step of transmitting, by a first user terminal that camps on a cell of a first base station, a direct discovery signal for discovering a proximal user terminal in proximity of the first user terminal; and
 a notification step of notifying, by a communication apparatus, the first base station of interference information in response to the communication apparatus receiving the direct discovery signal, wherein
 the interference information includes at least one of reception power of the discovery signal, transmission power control information of at least one of a discovery signal and a direct device-to-device communication signal, and identification of the user terminal,
 the direct discovery signal includes a cell identifier for identifying the cell of the first base station, and
 in the notification step, the communication apparatus notifies the first base station of the interference information on the basis of the cell identifier included in the direct discovery signal.

2. The communication control method according to claim 1, wherein the communication apparatus is a neighbor base station of the first base station.

3. The communication control method according to claim 1, wherein
 in the notification step, the communication apparatus notifies the first base station of the interference information when reception power of the direct discovery signal exceeds a threshold value.

4. The communication control method according to claim 1, wherein
 the direct discovery signal includes a terminal identifier for identifying the first user terminal, and
 in the notification step, the communication apparatus controls the terminal identifier to be included into the interference information.

5. The communication control method according to claim 1, wherein
 in the notification step, the communication apparatus controls reception power of the direct discovery signal in the communication apparatus, or transmission power control information of at least one of the direct discovery signal and a direct D2D communication signal to be included into the interference information.

6. The communication control method according to claim 1, further comprising:
 a step of sharing, by the communication apparatus, information on a radio resource with the first base station, the radio resource being used when the first user terminal transmits the direct discovery signal; and
 a step of detecting, by the communication apparatus, reception of the discovery-use signal on the basis of the shared information.

7. The communication control method according to claim 1, further comprising:
 a step of transmitting, by a second user terminal, power information on reception power of the direct discovery signal in the second user terminal to a serving cell of the second user terminal in response to the second user terminal receiving the direct discovery signal.

8. The communication control method according to claim 1, further comprising:
 a step of transmitting, by the first base station, power control information for reducing transmission power of at least one of the direct discovery signal and a direct D2D communication signal to the first user terminal in response to the first base station receiving the interference information.

9. The communication control method according to claim 1, further comprising:
 an instruction step of transmitting, by the first base station, instruction information for instructing transmission of the direct discovery signal to the first user terminal that is performing D2D communication, wherein
 in the transmission step, the first user terminal that is performing the D2D communication transmits the direct discovery signal in response to reception of the instruction information.

10. The communication control method according to claim 9, wherein
 in the instruction step, the first base station transmits the instruction information to the first user terminal, which is performing D2D communication, in response to the reception of the interference information.

11. The communication control method according to claim 10, wherein
 in the transmission step, the first user terminal that is performing the D2D communication cyclically transmits the direct discovery signal, and
 the communication control method further comprises: a step of transmitting, by the first base station, instruction information for instructing transmission stop of the direct discovery signal to the first user terminal when the first base station specifies the first user terminal as an interfering terminal on the basis of the interference information.

12. The communication control method according to claim 9, wherein
 in the instruction step, when it is determined that a geographical location of the first user terminal that is performing the D2D communication nears a geographical location of the second base station, the first base station transmits the instruction information to the first user terminal that is performing the D2D communication.

13. The communication control method according to claim 10, further comprising:
 a step of transmitting power control information for reducing transmission power of the D2D communication or resource information for changing a radio resource of the D2D communication to the first user terminal as interference avoidance control when the first base station specifies the first user terminal that is performing the D2D communication, as an interfering terminal on the basis of the interference information.

14. The communication control method according to claim 13, further comprising:
   a step of notifying, by the first base station, the communication apparatus of information indicating whether or not to perform the interference avoidance control.

15. The communication control method according to claim 1, wherein
   the communication apparatus is a user terminal controlling D2D communication, in a cluster comprising a plurality of user terminals adjacent to each other.

16. A base station that is used in a mobile communication system, comprising:
   a controller configured to notify another base station of information in response to the base station receiving a direct discovery signal, the discovery signal being transmitted from a user terminal that camps on a cell of the another base station and being for discovering a proximal user terminal in proximity of the user terminal, wherein
   the information includes at least one of reception power of the discovery signal, transmission power control information of at least one of a discovery signal and a direct device-to-device communication signal, and identification of the user terminal,
   the direct discovery signal includes a cell identifier for identifying the cell of the another base station, and
   the controller notifies the another base station of the interference information on the basis of the cell identifier included in the direct discovery signal.

* * * * *